Patented Mar. 15, 1949

2,464,322

UNITED STATES PATENT OFFICE 2,464,322

CHROMABLE MONOAZO PYRAZOLONE DYES

Adolf Krebser, Riehen, near Basel, and Peter Hindermann, Basel, Switzerland, assignors to the firm J. R. Geigy A. G., Basel, Switzerland No Drawing. Application March 24, 1943, Serial No. 480,370. In Switzerland May 16, 1942

2 Claims. (Cl. 260—163)

It has been found that valuable chromable monoazo dyestuffs are obtained by coupling 2-aminophenol-6-sulfonic acids containing in the 4-position a cycloalkyl radical or an alkyl radical with 3 to 8 carbon atoms, with pyrazolones having no free sulfonic and carboxylic acid groups.

As p-alkylated o-aminophenolsulfonic acids of the above definition, which can for example be obtained from the corresponding alkylphenols by sulfonation, nitration and subsequent reduction, there may be used for example: 2-amino-4-isopropylphenol-6-sulfonic acid, 2-amino-4-tert. butyl-phenol-6-sulfonic acid, 2-amino-4-n-butyl-phenol-6-sulfonic acid, 2-amino-4-tert. amyl-phenol-6-sulfonic acid, 2-amino-4-diisobutyl-phenol-6-sulfonic acid, 2-amino-4-cyclohexyl-phenol-6-sulfonic acid and the like.

As coupling components there may be used for example the following pyrazolones: 3-methyl-5-pyrazolone, 1-phenyl-3-methyl-5-pyrazolone, 1-(2'-methylphenyl)-3-methyl-5-pyrazolone, 1-phenyl-3-methyl-5-pyrazolone-3'- or -4'-sulfonamide, 1-(2'-chlorophenyl)-3-methyl - 5 - pyrazolone, 1-(3'- or 4'-chlorophenyl)-5-pyrazolone-3-carboxylic acid ethylester, 1-(3'-chlorophenyl)-5-pyrazolone-3-carboxylic acid amide, 1-(3'-chlorophenyl)-5-pyrazolone - 3 - carboxylic acid butylamine and so on.

The new dyestuffs dye wool from an acid dyebath in yellow shades which, on after-chroming, are converted into red shades and which may also be obtained directly according to the one-bath chroming process. The chromed dyeings possess very good water- and light-fastness properties.

The present invention is illustrated, but not limited, by the following examples, wherein the parts are by weight.

Example 1

23.1 parts of 2-amino-4-isopropylphenol-6-sulfonic acid (prepared from 4-isopropylphenol by sulfonation, nitration and reduction, the free acid being obtained in form of a grey crystal-powder which is easily soluble in hot water) are indirectly diazotised in the usual manner. The diazonium compound is coupled with 17.9 parts of 1-phenyl-3-methyl-5-pyrazolone in a solution made alkaline by means of sodium carbonate. When the dyestuff formation is complete, the dyestuff is salted out, filtered off and dried. Thus a yellow-brown powder is obtained dissolving in water with yellow-orange coloration and in concentrated sulfuric acid with orange coloration. When applied from an acid dyebath it dyes wool in yellow shades which, by after-chroming, may be converted into a yellowish red of good water- and light-fastness.

The dyestuff obtained according to the same method, but by starting from 2-amino-4-tert. butylphenol-6-sulfonic acid and 1-(2'-chlorophenyl)-3-methyl-5-pyrazolone, forms a red powder dissolving in water with a dark orange-red coloration, in concentrated sulfuric acid with a bright yellow-orange coloration and dyeing wool, when chromed, in yellowish-red shades of good water- and light-fastness. Dyeings having the same properties can also be obtained directly according to the one-bath chroming process.

When, in the above example, the 2-amino-4-isopropylphenol-6-sulfonic acid is replaced by the 2-amino-4-tert. amylphenol-6-sulfonic acid, a dyestuff is obtained which also constitutes a red powder possessing the same properties as that obtained from 2-amino-4-tert. butylphenol-6-sulfonic acid. The appended claims are directed specifically to this preferred form of the invention.

If in this example the 1-phenyl-3-methyl-5-pyrazolone is replaced by 1-(2'-methylphenyl)-3-methyl-5-pyrazolone or by 1-(4'-methylphenyl)- or 1-(2':4'-dimethylphenyl)-3-methyl-5-pyrazolone, dyestuffs having similar properties are obtained.

Example 2

24.5 parts of 2-amino-4-n-butylphenol-6-sulfonic acid (obtainable from 4-n-butylphenol in an analogous manner to that described in Example 1) are, as usual, indirectly diazotised and the diazonium compound so-obtained is coupled with 26.6 parts of 1-(3'-chlorophenyl)-5-pyrazolone-3-carboxylic acid ethylester in a soda alkaline solution. After completion of the dyestuff formation the dyestuff is precipitated by means of sodium chloride, isolated and dried. When applied according to the one-bath or after-chroming process the new dyestuff dyes wool in even bluish-red shades of good milling-, potting- and light-fastness and also of good fastness properties to alkalis.

Example 3

30.1 parts of 2-amino-4-diisobutylphenol-6-sulfonic acid made from 4-diisobutylphenol by sulfonation, nitration and subsequent reduction are indirectly diazotised and the diazonium compound is then coupled with 9.8 parts of 3-methyl-5-pyrazolone in a solution which is alkaline to sodium carbonate. As soon as the formation of the dyestuff is complete, the dyestuff is worked up in the usual manner. When applied according to the one-bath or after-chroming process, it dyes wool in yellowish-red shades of good water- and light-fastness.

Further examples illustrating this invention are enumerated in the following table:

2. A process for the manufacture of chromable monoazo dyestuffs which comprises coupling diazotised 2-amino-4-tert. amylphenol-6-sulfonic acid with 1-phenyl-3-methyl-5-pyrazolone.

ADOLF KREBSER.
PETER HINDERMANN.

| Example No. | Diazo-component | Coupling-component | Shade of the chromed dyeing |
|---|---|---|---|
| 4 | 2-amino-4-tert. butyl-phenol-6-sulfonic acid | 1-phenyl-3-methyl-5-pyrazolone | yellowish-red. |
| 5 | ----do---- | 1-phenyl-3-methyl-5-pyrazolone-4'-sulfonamide | Do. |
| 6 | ----do---- | 1-(3'-chlorophenyl)-5-pyrazolone-3-carboxylic acid ethylester | bluish-red. |
| 7 | 2-amino-4-n-butyl-phenol-6-sulfonic acid | 1-phenyl-3-methyl-5-pyrazolone | yellowish-red. |
| 8 | ----do---- | 1-(3'-chlorophenyl)-3-methyl-5-pyrazolone | Do. |
| 9 | ----do---- | 3-methyl-5-pyrazolone | Do. |
| 10 | 2-amino-4-tert. amyl-phenol-6-sulfonic acid | 1-(3'-chlorophenyl)-3-methyl-5-pyrazolone | Do. |
| 11 | ----do---- | 1-(2'-methylphenyl)-3-methyl-5-pyrazolone | Do. |
| 12 | ----do---- | 1-(2':4'-dimethyl-phenyl)-3-methyl-5-pyrazolone | Do. |
| 13 | ----do---- | 1-(2':4'-dichloro-phenyl)-3-methyl-5-pyrazolone | Do. |
| 14 | ----do---- | 1-(3':4'-dichlorophenyl)-3-methyl-5-pyrazolone | Do. |
| 15 | 2-amino-4-cyclohexylphenol-6-sulfonic acid | 1-phenyl-3-methyl-5-pyrazolone | Do. |
| 16 | ----do---- | 3-methyl-5-pyrazolone | Do. |
| 17 | ----do---- | 1-(3'-chlorophenyl)-5-pyrazolone-3-carboxylic acid amide | Do. |
| 18 | 2-amino-4-diisobutylphenol-6-sulfonic acid | 1-phenyl-3-methyl-5-pyrazolone | Do. |
| 19 | ----do---- | 1-(3'-chlorophenyl)-3-methyl-5-pyrazolone | Do. |
| 20 | ----do---- | 1-phenyl-3-methyl-5-pyrazolone-4'-sulfonamide | Do. |
| 21 | ----do---- | 1-(3'-chlorophenyl)-5-pyrazolone-3-carboxylic acid butylamide | Do. |
| 22 | ----do---- | 1-(4'-methylphenyl)-3-methyl-5-pyrazolone | Do. |

What we claim is:
1. The chromable monoazo dyestuff of the formula

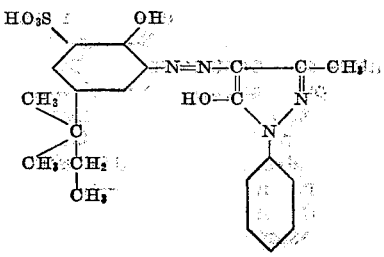

REFERENCES CITED

The following references are of record in the file of this patent:

UNITED STATES PATENTS

| Number | Name | Date |
|---|---|---|
| 1,828,055 | Krzikalla | Oct. 20, 1931 |
| 1,959,507 | Straub | May 22, 1934 |